(12) United States Patent
Jeong

(10) Patent No.: US 12,311,313 B2
(45) Date of Patent: May 27, 2025

(54) TWO-STAGE AIR DRYER SYSTEM

(71) Applicant: Industrial Technologies & Services Korea CO., LTD., Busan (KR)

(72) Inventor: Jong Won Jeong, Gwangsan-gu (KR)

(73) Assignee: Industrial Technologies & Services Korea Co., Ltd., Busan (KR)

( * ) Notice: Subject to any disclaimer, the term of this patent is extended or adjusted under 35 U.S.C. 154(b) by 0 days.

(21) Appl. No.: 18/413,787

(22) Filed: Jan. 16, 2024

(65) Prior Publication Data

US 2024/0149214 A1    May 9, 2024
US 2024/0335788 A2    Oct. 10, 2024

Related U.S. Application Data

(63) Continuation of application No. 16/740,005, filed on Jan. 10, 2020, now Pat. No. 11,904,271.

(30) Foreign Application Priority Data

Jan. 18, 2019   (KR) ........................ 10-2019-0006539

(51) Int. Cl.
*B01D 53/26*     (2006.01)
*B01D 53/28*     (2006.01)

(52) U.S. Cl.
CPC ........... *B01D 53/265* (2013.01); *B01D 53/28* (2013.01); *B01D 2255/2045* (2013.01); *B01D 2257/80* (2013.01)

(58) Field of Classification Search
None
See application file for complete search history.

(56) References Cited

U.S. PATENT DOCUMENTS

| | | |
|---|---|---|
| 3,246,453 A | 4/1966 | Becker |
| 4,541,250 A | 9/1985 | Tropeano et al. |
| 6,221,130 B1 | 4/2001 | Kolodziej et al. |
| 8,857,207 B2 | 10/2014 | Dering et al. |
| 2015/0252271 A1 | 9/2015 | Vassieu et al. |

(Continued)

FOREIGN PATENT DOCUMENTS

| | | |
|---|---|---|
| JP | 2017198407 A | 11/2017 |
| JP | 2018118246 A | 8/2018 |
| KR | 200347182 Y1 | 4/2004 |

(Continued)

OTHER PUBLICATIONS

Translation of KR20090035415A, accessed Aug. 5, 2024 (Year: 2009).*

*Primary Examiner* — Christopher P Jones
*Assistant Examiner* — Phillip Y Shao
(74) *Attorney, Agent, or Firm* — Kevin E. West; Advent, LLP

(57) ABSTRACT

Provided is a two-stage dryer system. The two-stage dryer system includes a cooling dehumidifier configured to condense and remove moisture contained in compressed air by cooling the compressed air flowing therein, and then discharge the compressed air; and a deliquescent dehumidifier configured to bring the compressed air discharged from the cooling dehumidifier in contact with a deliquescent agent to remove the moisture contained in the compressed air through a process of deliquescence caused by the deliquescent agent, and then discharge the air with the moisture removed.

18 Claims, 2 Drawing Sheets

(56) References Cited

U.S. PATENT DOCUMENTS

2019/0309964 A1   10/2019   Fujita et al.

FOREIGN PATENT DOCUMENTS

| KR | 20090035415 A | 4/2009 |
| KR | 101081821 B1 | 11/2011 |
| KR | 20120010305 A | 2/2012 |
| KR | 20140069407 A | 6/2014 |
| KR | 101664265 B1 | 10/2016 |
| KR | 101687360 B1 | 12/2016 |
| KR | 20180109256 A | 10/2018 |

* cited by examiner

TWO-STAGE AIR DRYER SYSTEM

CROSS-REFERENCE TO RELATED APPLICATION

This application is a continuation of U.S. patent application Ser. No. 16/740,005, filed Jan. 10, 2020, and titled "TWO-STAGE AIR DRYER SYSTEM", which is based upon and claims the benefit of priority form Korean Patent Application No. 10-2019-0006539, filed on Jan. 18, 2019. U.S. patent application Ser. No. 16/740,005 and Korean Patent Application No. 10-2019-0006539_are incorporated herein by reference in their entireties.

TECHNICAL FIELD

The present disclosure relates to a two-stage air dryer system and, more particularly, to a two-stage air dryer system that can reduce the use amount of energy by removing moisture using a deliquescent dehumidifier that uses a deliquescent agent, that can reduce the use amount of a deliquescent agent by reducing a dehumidification load of the deliquescent agent in a deliquescent dehumidifier by being configured to cool air using a cooling dehumidifier and, simultaneously, primarily remove moisture and then secondarily remove moisture using the deliquescent dehumidifier, and that can reduce operational expenses by sufficiently removing moisture such that dew condensation does not occur at a common temperature at which compressed air is used even if a deliquescent agent having a low water absorption ratio is used.

BACKGROUND

In general, compressed air is used in almost all industrial fields such as semiconductor manufacturing, electronic, mechanical, and chemical industries. Such compressed air is produced from a compressor that uses the air in the atmosphere, but the compressed air produced in this way fundamentally contains moisture and foreign substances in addition to the air in the atmosphere, so compressed air with foreign substances and moisture removed is needed particularly in a precise industry that requires a clean environment.

Compressed air is obtained using an air compressor in various industrial sites where compressed air is used, an oil component sticking on various mechanical parts such as a compression piston flows into the compressed air, and the dust or moisture in the atmosphere is also included in the process of compressing air using the air compressor.

In particular, moisture is naturally produced in accordance with a change of a saturation state when air is compressed. When compressed air containing moisture or an oil component is used for various machines, the compressed air can be used without any processing, but air containing moisture or an oil component may cause significant damage in precise industrial sites such as a food treatment process, a chemical treatment process, or a semiconductor production line. Accordingly, an air dryer system is applied to various precise industrial sites to remove moisture contained in such air.

As an air dryer system, in the related art, there is a cooling type that removes moisture by cooling air under a dew point temperature using a freezer such as in Korean Patent No. 10-1081821 (2011 Nov. 3, Energy-efficient refrigerated air dryer dehumidify device). However, such a cooling type air dryer system is always operated to cool compressed air, so it has a problem that energy is excessively consumed.

Due to this problem, recently, absorption type air dryer systems that have high dehumidification efficiency and that can remove moisture at a very low dew point temperature such as Korean Patent Application Publication No. 10-2018-0109256 (2018 Oct. 8, Absorption type air dryer) or Korean Patent No. 10-1687360 (2016 Dec. 12, Air generating system for absorption type dryer) are generally used.

However, such absorption type air dryer systems also have a problem in that they require a high cost to recycle an adsorbent, and the dehumidification function is deteriorated when oil is absorbed to the adsorbent.

SUMMARY

The present disclosure has been made in consideration of the matters described above, and various embodiments of the present disclosure provides a two-stage air dryer system that can reduce the use amount of energy by removing moisture using a deliquescent dehumidifier that uses a deliquescent agent, that can reduce the use amount of a deliquescent agent by reducing a dehumidification load of the deliquescent agent in a deliquescent dehumidifier by being configured to cool air using a cooling dehumidifier and, simultaneously, primarily remove moisture and then secondarily remove moisture using the deliquescent dehumidifier, and that can reduce operational expenses by sufficiently removing moisture such that dew condensation does not occur at a common temperature at which a compressed air is used even if a deliquescent agent having a low water absorption ratio is used.

According to an embodiment of the present disclosure, a two-stage dryer system comprises: a cooling dehumidifier configured to condense and remove moisture contained in compressed air by cooling the compressed air flowing in the cooling dehumidifier, and then discharge the compressed air; and a deliquescent dehumidifier configured to bring the compressed air discharged from the cooling dehumidifier in contact with a deliquescent agent to remove the moisture contained in the compressed air through a process of deliquescence caused by the deliquescent agent, and then discharge the air with the moisture removed. The cooling dehumidifier includes: a freezer in which a refrigerant circulates through a refrigeration cycle: and a heat exchanger having a phase change material and a channel in which the compressed air flows. A first heat exchange between the phase change material and the freezer is performed, and a second heat exchange between the channel and the phase change material is performed. The refrigerant of the freezer causes phase change of the phase change material while evaporating by absorbing heat of the phase change material. The phase change material cools the compressed air while absorbing heat of the compressed air.

According to an embodiment, the cooling dehumidifier further includes a gas-liquid separator configured to separate and discharge the condensed moisture by flowing the compressed air through the heat exchanger.

According to an embodiment, the deliquescent dehumidifier includes a dehumidifying tank, into a lower portion of which the compressed air discharged from the cooling dehumidifier flows, and an upper portion from which the compressed air is discharged upward. An inside of the dehumidifying tank is divided into the upper portion and the lower portion by a perforated screen. A pressure distribution layer filled with a granular material having a predetermined size or larger and a dehumidifying layer filled with a deliquescent agent that is disposed over the pressure distribution layer are disposed over the perforated screen. The compressed air flows from an under side of the perforated screen and is then discharged sequentially through the pressure distribution layer and the dehumidifying layer.

According to an embodiment, the deliquescent agent includes at least one of calcium, kalium, and natrium.

According to an embodiment, the two-stage dryer system further comprises a pre-heater configured to perform a third heat exchange between the compressed air flowing into the cooling dehumidifier and the compressed air discharged from the deliquescent dehumidifier. The compressed air flowing into the cooling dehumidifier is cooled and flows into the cooling dehumidifier and the compressed air discharged from the deliquescent dehumidifier is heated and then discharged.

BRIEF DESCRIPTION OF DRAWINGS

The accompanying drawings, which are incorporated in and constitute a part of the specification, illustrate embodiments of the present disclosure.

DETAILED DESCRIPTION

Hereafter, a two-stage dryer system according to an embodiment of the present disclosure is described in detail with reference to drawings and embodiments.

Figure 1:
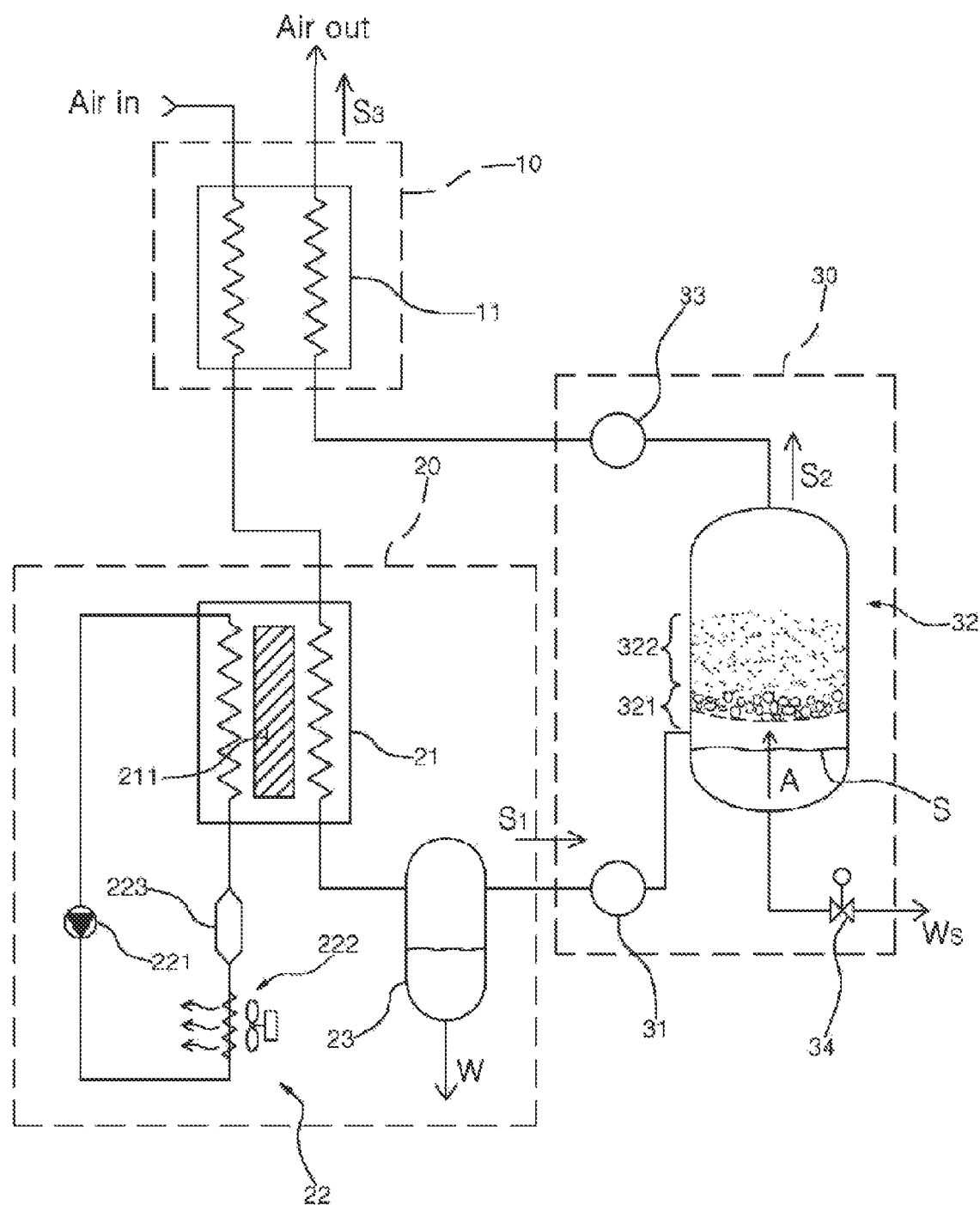
FIG. 1 is a configuration diagram showing a two-stage dryer system according to an embodiment of the present disclosure.
Figure 2:
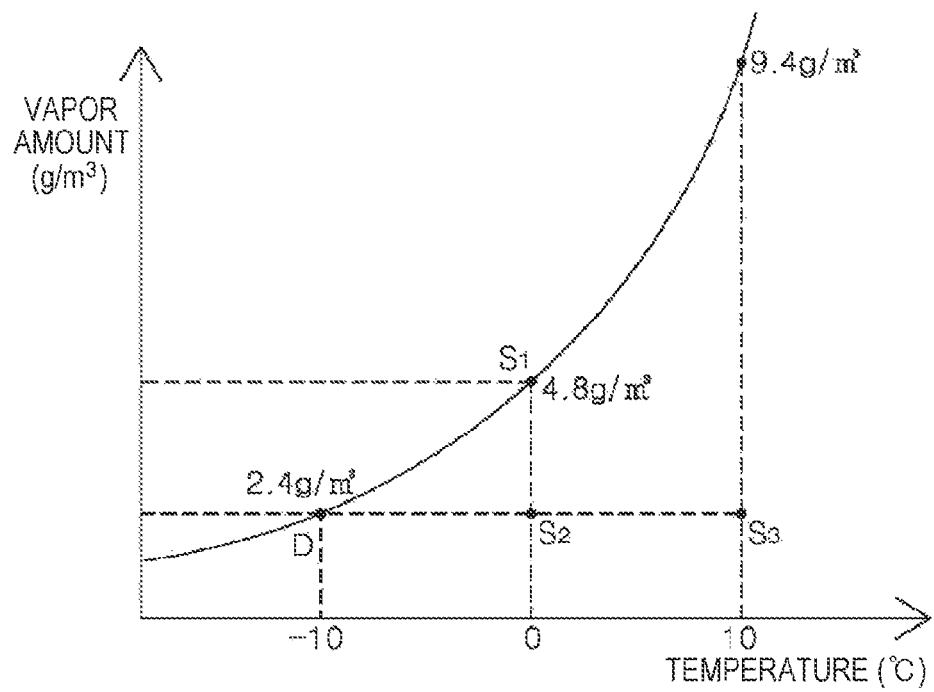
FIG. 2 is a saturated vapor graph showing a process in which dehumidification is sufficiently made by the two-stage dryer system according to an embodiment of the present disclosure.

FIG. 1 is a configuration diagram showing a two-stage dryer system according to an embodiment of the present disclosure and FIG. 2 is a saturated vapor graph showing a process in which dehumidification is sufficiently made by the two-stage dryer system according to an embodiment of the present disclosure.

A two-stage dryer system according to an embodiment of the present disclosure is configured to be able to maximize a dehumidification effect by primarily removing moisture through cooling that uses a phase change material in a cooling dehumidifier 20 and then secondarily removing moisture from compressed air with moisture primarily removed using a deliquescent agent in a deliquescent dehumidifier 30. In particular, the two-stage dryer system according to an embodiment of the present disclosure is characterized by being configured to be able to reduce the use amount of energy and the cost for maintenance because it can reduce the use amount of energy by accumulating and using cooling patent heat in a phase change material (PCM), unlike the cooling type that has to always operate a cooling cycle by cooling compressed air using a phase change material, and it also can perform dehumidification without power and without a recycle cost by using a deliquescent agent unlike a dehumidification type that uses an adsorbent.

In particular, the two-stage dryer system according to an embodiment of the present disclosure is configured to primarily remove moisture while cooling air using a cooling dehumidifier and then secondarily remove moisture through a deliquescent dehumidifier, whereby it is possible to reduce the use amount of a deliquescent agent by decreasing a dehumidification load on the deliquescent agent in the deliquescent dehumidifier. Further, it is possible to sufficiently remove moisture such that a dew point where dew condensation occurs is not reached within a common temperature range in which compressed air is used even if a deliquescent agent having a low absorption ratio is used for a deliquescent dehumidifier, so it is possible to use a deliquescent agent having a low absorption ratio but being inexpensive, whereby it is possible to reduce the operational expenses of an air dryer.

Referring to the figures, a two-stage dryer system according to an embodiment of the present disclosure includes a pre-heater 10, a cooling dehumidifier 20, a deliquescent dehumidifier 30, and a controller.

The pre-heater 10 is configured such that compressed air flowing into the cooling dehumidifier 20 and compressed air discharged from the deliquescent dehumidifier 30 exchange heat with each other, whereby the compressed air flowing into the cooling dehumidifier 20 is cooled and then flows into the cooling dehumidifier 20 and the compressed air discharged with moisture removed from the deliquescent dehumidifier 30 is heated and then discharged.

That is, the pre-heater 10 not only cools in advance compressed air flowing into the cooling dehumidifier 20, which cools compressed air in order to dehumidify compressed air increased in temperature by being adiabatically heated through a compressor, but also heats the compressed air cooled through the cooling dehumidifier 20 and the deliquescent dehumidifier 30 for dehumidification such that the compressed air is discharged with relative humidity decreased. In particular, the pre-heater 10 is characterized by being configured to be able to prevent a waste of energy because it allows for heat exchange between the compressed air that flows inside and the compressed air that is discharged.

Referring to the figures, the pre-heater 10 includes a heat exchanger 11 for heat exchange between compressed air having high temperature and flowing into the cooling dehumidifier 20 and compressed air having low temperature and discharged from the deliquescent dehumidifier 30.

The cooling dehumidifier 20 is configured to condense and remove moisture contained in compressed air while cooling the compressed air, which has been cooled in a predetermined degree and sent inside through the pre-heater 10, using a cooler. The cooler for cooling compressed air in the cooling dehumidifier 20 may be configured in various was. For example, the cooler may be configured to cool compressed air using heat exchange between cold water supplied from the outside and compressed air. The cooler may be a freezer that is operated in a refrigeration cycle.

However, a cooler that is configured such that compressed air is cooled by exchanging heat with a phase change material in order to be able to sufficiently cool compressed air and reduce the use amount of energy is exemplified in the figures, and hereafter, the cooling dehumidifier 20 is described in detail with reference to the embodiments shown in the figures.

Referring to the figures, the cooling dehumidifier 20 includes a heat exchanger 21, a freezer 22, and a gas-liquid separator 23.

The heat exchanger 21 is configured to allow for heat exchange such that a phase change material 211 is cooled while changing the phase when a refrigerant of the freezer 22 evaporates by absorbing heat of the phase change material 211, and the cooled phase change material 211 changes the phase while absorbing heat of compressed air and simultaneously the compressed air is cooled.

That is, according to the heat exchanger 21, the phase change material 211 is configured to be changed in phase into a low energy state in by the cooler 22, thereby maintaining coldness, then the phase change material 211 is configured to cool the compressed air by changing the phase into a high energy state by absorbing heat of the compressed air in the low energy state.

The present disclosure is configured to accumulate coldness through the phase change material 211 in the heat exchanger 21 and then cool the compressed air, so the freezer 22 is operated only when cooling the phase change material 211, whereby it is possible to prevent excessive consumption of energy by repeatedly operating and stopping the freezer 22.

The freezer 22 is configured to cool the phase change material 211 and is similar to a cooling device having a common refrigeration cycle composed of a compressor 221, a condenser 222, an expansion valve 223, and an evaporator through which a refrigerant flows, so it is not described in detail.

The gas-liquid separator 23 is configured to separate moisture, which has been contained in compressed air and condensed through the heat exchanger 21, and compressed air in a gas state from each other, and to discharge the separated condensed water W.

The deliquescent dehumidifier 30 is configured such that compressed air discharged with moisture primarily removed through the cooling dehumidifier 20 flows inside and then moisture is removed by a deliquescent agent by coming in contact with the deliquescent agent.

Referring to the figures, the compressed air discharged through the cooling dehumidifier 20 flows through a pre-filter 31 such that dust or oil components are removed, and then flows into a dehumidifying tank 32 having a deliquescent agent.

The dehumidifying tank 32 has a common tank shape and the inside thereof is divided into an upper portion and a lower portion by a perforated screen S. A pressure distribution layer 321 filled with a granular material having a predetermined size or larger, such as ceramic balls, and a dehumidifying layer 322 filled with a deliquescent agent that is disposed over the pressure distribution layer 321 are disposed over the perforated screen S, whereby a sequential layer structure is formed.

The perforated screen S is configured to prevent a loss of the granular material (for example, ceramic balls) and the deliquescent agent in the pressure distribution layer 321 and the dehumidifying layer 322. Referring to the figures, the perforated screen S is positioned higher than an inlet, through which compressed air flows inside, at a predetermined height from the bottom of the dehumidifying tank 32. The perforated screen S is a plate having several through-holes through which compressed air passes (which also function as channels through which condensed water drops), and the through-holes have a diameter smaller than the diameter of the ceramic balls.

The compressed air discharged from the cooling dehumidifier 20 flows the lower portion the dehumidifying tank 32 and is then discharged upward. That is, the compressed air flows from under the perforated screen S and is then discharged sequentially through the pressure distribution layer 321 and the dehumidifying layer 322. In this process, moisture contained in the compressed air is changed into solution by the deliquescent agent in the dehumidifying layer 322, and the solution produced from the moisture collects at the lower portion in the dehumidifying tank 32 through the holes of the perforated screen S, that is, the moisture contained in the compressed air drops down in the dehumidifying tank 32 as deliquescent condensed water by reacting with the deliquescent agent. Further, the compressed air passes through the dehumidifying layer 322 stacked in the dehumidifying tank 32 and then flows to the top of the dehumidifying tank 32 and is discharged outside through a pipe.

The present disclosure has an advantage that electricity is never used when the deliquescent dehumidifier 30 removes moisture and an advantage that compressed air is used and there is no loss of compressed air unlike the case that uses an adsorbent that needs to be recycled.

The pressure distribution layer 321 may be configured by stacking spherical ceramic balls and protects the deliquescent agent by distributing pressure of compressed air supplied at high pressure, that is, slowing down the compressed air to flow to the dehumidifying layer 322. In order to solve the above problems, the ceramic balls may have a granular size smaller than that of the deliquescent agent, and the ceramic balls may be replaced with other materials that can distribute pressure.

The dehumidifying layer 322 is configured by stacking various deliquescent agents with a predetermined height over the pressure distribution layer 321, and removes moisture contained in compressed air flowing upward through the pressure distribution layer 321.

The deliquescent agent is produced by mixing several metal ion compounds. Since the deliquescent agent is produced by mixing metal ion compounds, the deliquescent agent has deliquescence, and accordingly, when moisture comes in contact with the deliquescent agent, the deliquescent agent and the moisture react with each other and the surface of the deliquescent agent melts down, whereby a deliquescent condensed water Ws drops to the bottom in the dehumidifying tank 32.

The deliquescent condensed water Ws that has dropped, as described above, is discharged outside by operation of a drain valve 34 disposed under the dehumidifying tank 32.

The deliquescent agent having the function described above may be composed of calcium (Ca) of 0.06~0.10 percent by weight, kalium (K) of 9.5~10.4 percent by weight, natrium (Na) of 89.5~9.4 percent by weight, strontium (Sr) of 0.03~0.07 percent by weight, and magnesium (Mg) of 0.01~0.02 percent by weight, may be composed of calcium (Ca) of 8~13 percent by weight, kalium (K) of 50~55 percent by weight, natrium (Na) of 17~22 percent by weight, strontium (Sr) of 2~4 percent by weight, magnesium (Mg) of 0.02~0.05 percent by weight, lithium (Li) of 10~15 percent by weight, and zinc (Zn) of 0.04~0.07 percent by weight, or may be composed of calcium (Ca) of 13~20 percent by weight, kalium (K) of 55~65 percent by weight, natrium (Na) of 10~15 percent by weight, strontium (Sr) of 2~5 percent by weight, magnesium (Mg) of 0.3~0.7 percent by weight, lithium (Li) of 5~7 percent by weight, and zinc (Zn) of 0.04~0.08 percent by weight.

The compressed air with moisture removed through the dehumidifying tank 32 is discharged to the heat exchanger 11 of the pre-heater 10 through a post-filter 33. Further, the compressed air is heated into dried air through the heat exchanger 11 of the pre-heater 10, is discharged outside, and is then supplied to a place or an apparatus that uses compressed air.

The controller is configured to control the operation of the pre-heater 10, the cooling dehumidifier 20 and the deliquescent dehumidifier 30 or the operation of valves, etc. installed in pipes.

The present disclosure senses the state of the phase change material 211 of the cooling dehumidifier 20 and operates the freezer 22 only when the phase change material needs to be cooled, which is performed by controlling the operation of the cooling dehumidifier 20 using the controller. That is, the controller operates the freezer 22 to cool the phase change material 211 that changes in phase between solid and liquid when the phase change material 211 is sensed as being in a high-temperature state, that is, sensed as being in a liquid state, and stops operation of the freezer 22 when the phase change material 211 is sensed as being in a low-temperature state that can sufficiently cool compressed air, that is, sensed as being in a solid state.

Since the freezer 22 is controlled to operate only when cooling the phase change material 211 by the controller, as described above, the present disclosure can prevent excessive consumption of energy unlike a common configuration that includes only a freezer without a phase change material and repeatedly operates and stops the freezer.

The operation of the deliquescent dehumidifier 30 is also controlled by the controller, and particularly, the operation of the drain valve 34 for discharging the deliquescent condensed water Ws collecting at the lower portion in the dehumidifying tank 32 of the deliquescent dehumidifier 30 is controlled by the controller. That is, when the deliquescent condensed water Ws collects over a predetermined level at the lower portion in the dehumidifying tank 32, the controller senses it and opens the drain valve 34, thereby discharging the deliquescent condensed water Ws to the outside. The deliquescent condensed water Ws is discharged with compressed air prevented from flowing into or being discharged out of the dehumidifying tank 32 so that the pressure of the compressed air is not wasted.

The deliquescent condensed water Ws has very high viscosity because the deliquescent agent has been melted, so when it is stagnant, deposits are produced and stick to the wall of a pipe for draining, whereby the pipe for draining may be clogged. Periodic washing is required to open up the clogged pipe and the present disclosure is configured such that such washing is periodically performed by the controller.

That is, according to the present disclosure, the drain valve 34 is periodically controlled to be opened without supply of compressed air to the dehumidifying tank 32 stopped, in order to wash the pipe for discharging the deliquescent condensed water Ws. Since compressed air flows into the dehumidifying tank 32 to remove moisture, the inside of the dehumidifying tank 32 is under relatively high pressure, and when the drain valve 34 is opened in this state, the deliquescent condensed water Ws flows at a high speed to the pipe, which performs draining, due to pressure, and accordingly, dirt is washed before sticking to the inside of the pipe. The present disclosure is configured such that such washing is performed with regular intervals by the controller, thereby being able to prevent the pipe for draining from being clogged.

As described above, since the present disclosure is configured to primarily remove moisture while cooling air using the cooling dehumidifier 20 and then secondarily remove moisture through the deliquescent dehumidifier 30, a dehumidification load of the deliquescent dehumidifier is reduced, thereby being able to reduce the use amount of the deliquescent agent. That is, since the compressed air flows into the deliquescent dehumidifier 30 with moisture primarily removed by the cooling dehumidifier 20, it is possible to absolutely reduce consumption of the deliquescent agent.

Further, according to the present disclosure, it is possible to sufficiently remove moisture such that dew condensation does not occur at a common temperature at which compressed air is used even if a deliquescent agent having a low water absorption ratio is used, the operational expenses can be reduced. Such operation is described in detail with reference to the graph of FIG. 2 that shows the state of compressed air of which moisture is removed and the configuration of FIG. 1.

Referring to FIG. 1, in general, compressed air is sent at high temperature into the pre-heater 10 and then cooled therein by adiabatically compressing air. The compressed air can be cooled to temperature at which dew condensation occurs in the pre-heater 10, and even if dew condensation does not occur, dew condensation occurs while the compressed air is cooled in the cooling dehumidifier 20, so the compressed air is discharged with moisture primarily removed (S1 in FIGS. 1 and 2). It is assumed in the figures that the temperature of the compressed air discharged from the cooling dehumidifier 20 is 0° C. Referring to the graph of FIG. 2, the compressed air discharged in the state S1 at 0° C. from the cooling dehumidifier 20 is in a saturation state and has a vapor amount of 4.8 g/m$^3$. When the compressed air in the state S1 flows into the deliquescent dehumidifier 30, the moisture contained in the compressed air is removed by being absorbed into the deliquescent agent. A deliquescent agent having a moisture absorption amount of 100% (RH100) is used to completely absorb moisture, but a deliquescent agent of RH 100 is relatively expensive. However, according to the present disclosure, even though a deliquescent agent of RH 50 that is very inexpensive relatively to the deliquescent agent of RH 100 is applied, moisture is removed by 50% through the dehumidifying tank 32, so compressed air is discharged in a state S2 having a vapor amount of 2.4 g/m$^3$ (which is a half of the vapor amount of 4.8 g/m$^3$). The compressed air having a vapor amount of 2.4 g/m$^3$ is in a state that reaches a saturation state (D in FIG. 2) in which dew condensation occurs at about sub-zero 10° C. (−10° C.), so the present disclosure can be applied without dew condensation in a common condition that uses compressed air even though moisture is removed using the deliquescent agent of RH 50. This means that it is possible to accomplish sufficient dehumidification effect even by using a deliquescent agent having an absorption ratio lower than RH 50 when the temperature of the condition for using compressed air is high. Further, since the compressed air with moisture removed through the deliquescent dehumidifier 30 is heated (into a state S3) through the pre-heater 10 and discharged outside, as described above, the possibility of the compressed air going into a saturation state in which dew condensation occurs is very small.

As described above, the reason that moisture is sufficiently removed such that there is no problem in using common compressed air even though a deliquescent agent under RH 50 which is relatively inexpensive is used is because moisture is primarily removed while compressed air is cooled by the cooling dehumidifier 20, and moisture is secondarily removed through the deliquescent dehumidifier 30.

According to this configuration, the two-stage air dryer system according to the present disclosure has an advantage that it is possible to reduce the use amount of energy by removing moisture using a deliquescent dehumidifier that uses a deliquescent agent, to reduce the use amount of a deliquescent agent by reducing a dehumidification load of the deliquescent agent in a deliquescent dehumidifier because it is configured to cool air using a cooling dehumidifier and simultaneously primarily remove moisture and then secondarily remove moisture using the deliquescent dehumidifier, and to reduce operational expenses because it can sufficiently remove moisture such that dew condensation does not occur at a common temperature at which a compressed air is used even if a deliquescent agent having a low water absorption ratio is used.

The two-stage air dryer system described above and shown in the figures is only an embodiment for achieving the present disclosure and should not be construed as limiting the spirit of the present disclosure. The protective range of the present disclosure is determined only by those described in claims and embodiments changed and modified without departing from the spirit of the present disclosure should be construed as being included in the protective range of the present disclosure that is apparent to those skilled in the art.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A method for drying a compressed air flow in a two-stage air dryer system comprising:
    transferring a first amount of heat from a compressed airflow flowing in a first channel of a first heat exchanger to the compressed airflow flowing in a second channel of the first heat exchanger;
    receiving the compressed airflow from the first heat exchanger in a cooling dehumidifier, the cooling dehumidifier including a second heat exchanger;
    circulating the compressed airflow through a first channel of the second heat exchanger;
    circulating a refrigerant through a second channel of the second heat exchanger;
    transferring a second amount of heat from the compressed airflow to the refrigerant via a phase change material, whereby the transfer of the second amount of heat from the compressed airflow removes a first amount of moisture from the compressed airflow; and
    delivering the compressed airflow to a deliquescent dehumidifier, the deliquescent dehumidifier configured to bring the compressed airflow discharged from the cooling dehumidifier in contact with a deliquescent agent to remove a second amount of moisture contained in the compressed airflow through a process of deliquescence caused by the deliquescent agent;
    discharging the compressed airflow with the second amount of moisture removed; and
    delivering the compressed airflow to the second channel of the first heat exchanger in its entirety, the compressed airflow flowing in the second channel of the first heat exchanger receiving the first amount of heat from the compressed airflow flowing in the first channel of the first heat exchanger prior to being delivered by the air dryer system.

2. The method of claim 1, further comprising:
    operating a refrigeration cycle of a freezer circulating the refrigerant when the phase change material is in a liquid state, and
    ceasing operation of the refrigeration cycle of the freezer when the phase change material is in a solid state.

3. The method of claim 1, further comprising separating and discharging the condensed first amount of moisture from the first compressed airflow in a gas-liquid separator.

4. The method of claim 1, further comprising:
    providing a dehumidifying tank in the deliquescent dehumidifier, the dehumidifying tank having a lower portion and an upper portion divided by a perforated screen,
    disposing a layer of granular material over the perforated screen,
    disposing a layer of deliquescent agent over the layer of granular material.

5. The method of claim 4, further comprising:
    circulating the compressed air flow from the lower portion to the upper portion of the dehumidifying tank, wherein the second amount of moisture reacts with a surface of the deliquescent agent, the surface of the deliquescent agent melting into a deliquescent condensed water.

6. The method of claim 5, further comprising discharging the deliquescent condensed water collected at the lower portion of the dehumidifying tank when the deliquescent condensed water level has reached a pre-determined level.

7. The method of claim 1, wherein the deliquescent agent includes at least one of calcium (Ca), kalium (K), and natrium (Na).

8. The method of claim 1, wherein the deliquescent agent has a moisture absorption ratio of less than or equal to 50% ($\leq$RH 50).

9. The method of claim 1, further comprising removing particles from the first compressed prior to entering the deliquescent dehumidifier.

10. A method for drying a compressed air flow in a two-stage air dryer system comprising:
    transferring a first amount of heat from a compressed airflow flowing in a first channel of a first heat exchanger to the compressed airflow flowing in a second channel of the first heat exchanger;
    receiving the compressed airflow from the first heat exchanger in a cooling dehumidifier, the cooling dehumidifier including a second heat exchanger;
    circulating the compressed airflow through a first channel of the second heat exchanger;
    circulating a refrigerant through a refrigeration cycle of a freezer, the freezer directing the refrigerant through second channel of the second heat exchanger;
    transferring a second amount of heat from the first compressed airflow to the refrigerant via a phase change material, whereby the transfer of the second amount of heat from the first compressed airflow removes a first amount of moisture from the first compressed airflow; and
    delivering the compressed airflow to a deliquescent dehumidifier, the deliquescent dehumidifier configured to bring the compressed airflow discharged from the cooling dehumidifier in contact with a deliquescent agent to remove a second amount of moisture contained in the compressed airflow through a process of deliquescence caused by the deliquescent agent; and
    discharging the compressed airflow with the second amount of moisture removed; and
    delivering the compressed airflow to the second channel of the first heat exchanger in its entirety, the compressed airflow flowing in the second channel of the first heat exchanger receiving the first amount of heat from the compressed airflow flowing in the first channel of the first heat exchanger prior to being delivered by the air dryer system.

11. The method of claim 10, further comprising:
    operating the refrigeration cycle of the freezer when the phase change material is in a liquid state, and ceasing operation of the refrigeration cycle of the freezer when the phase change material is in a solid state.

12. The method of claim 10, further comprising separating and discharging the condensed first amount of moisture from the first compressed airflow in a gas-liquid separator.

13. The method of claim 10, further comprising:
providing a dehumidifying tank in the deliquescent dehumidifier, the dehumidifying tank having a lower portion and an upper portion divided by a perforated screen,
disposing a layer of granular material over the perforated screen,
disposing a layer of deliquescent agent over the layer of granular material.

14. The method of claim 13, further comprising:
circulating the compressed air flow from the lower portion to the upper portion of the dehumidifying tank, wherein the second amount of moisture reacts with a surface of the deliquescent agent, the surface of the deliquescent agent melting into a deliquescent condensed water.

15. The method of claim 14, further comprising discharging the deliquescent condensed water collected at the lower portion of the dehumidifying tank when the deliquescent condensed water level has reached a pre-determined level.

16. The method of claim 10, wherein the deliquescent agent includes at least one of calcium (Ca), kalium (K), and natrium (Na).

17. The method of claim 10, wherein the deliquescent agent has a moisture absorption ratio of less than or equal to 50% ($\leq$RH 50).

18. The method of claim 10, further comprising removing particles from the first compressed prior to entering the deliquescent dehumidifier.

* * * * *